US010354543B2

(12) United States Patent
Chetlur et al.

(10) Patent No.: US 10,354,543 B2
(45) Date of Patent: Jul. 16, 2019

(54) IMPLEMENTING ASSESSMENTS BY CORRELATING BROWSING PATTERNS

(71) Applicant: International Business Machines Corporation, Armonk, NY (US)

(72) Inventors: Malolan Chetlur, Bangalore (IN); Pankaj Dayama, Bangalore (IN); Vijay Ekambaram, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 515 days.

(21) Appl. No.: 14/972,629

(22) Filed: Dec. 17, 2015

(65) Prior Publication Data

US 2017/0178529 A1 Jun. 22, 2017

(51) Int. Cl.
G09B 5/00 (2006.01)
G09B 7/02 (2006.01)
G09B 5/02 (2006.01)

(52) U.S. Cl.
CPC ............... *G09B 7/02* (2013.01); *G09B 5/02* (2013.01)

(58) Field of Classification Search
CPC ... G09B 7/00; G09B 7/02; G09B 7/08; G09B 5/02; G06F 17/30699
See application file for complete search history.

(56) References Cited

U.S. PATENT DOCUMENTS

| 7,286,793 | B1 * | 10/2007 | Miele ........................ | G09B 7/00 434/323 |
| 8,834,166 | B1 * | 9/2014 | Ionkov .............. | G06F 17/30595 434/178 |
| 2007/0269788 | A1 * | 11/2007 | Flowers ................... | G09B 7/00 434/350 |

(Continued)

FOREIGN PATENT DOCUMENTS

CA 103577507 A 2/2014

OTHER PUBLICATIONS

Sudhana et al. Content Adaptation Approach in Context-Aware Delivery of Learning Material, Australian Journal of Basic and Applied Sciences, 7(9):275-282, 2013.

(Continued)

*Primary Examiner* — Peter R Egloff
(74) *Attorney, Agent, or Firm* — Ryan, Mason & Lewis, LLP (57) ABSTRACT

Methods, systems, and computer program products for implementing assessments by correlating browsing patterns are provided herein. A computer-implemented method includes detecting web browsing anomalies (i) attributed to a user and (ii) related to answering questions pertaining to predetermined content; estimating the probability of the user answering a question pertaining to the predetermined content based on (i) skills associated with the user and (ii) identification of required concepts associated with the predetermined content; dynamically generating at least two sets (Continued)

of questions pertaining to the predetermined content based on the detected web browsing anomalies; determining a time interval during a user web tutorial session at which to pose to the user a question from one of the sets of questions based at least on (i) the estimated probability and (ii) an estimated level of user engagement; and outputting to the user the question in accordance with the determined time interval.

20 Claims, 3 Drawing Sheets

(56) References Cited

U.S. PATENT DOCUMENTS

| | | | |
|---|---|---|---|
| 2010/0199294 A1* | 8/2010 | Choi | H04N 7/17318 725/13 |
| 2013/0325897 A1* | 12/2013 | Motgi | G06F 17/30699 707/776 |
| 2014/0080110 A1* | 3/2014 | Nguyen | G09B 7/00 434/362 |
| 2014/0180766 A1 | 6/2014 | Tetreault et al. | |
| 2015/0056597 A1 | 2/2015 | Kutty et al. | |
| 2015/0125845 A1 | 5/2015 | Cho et al. | |
| 2016/0035230 A1* | 2/2016 | Spaulding | G09B 5/02 434/236 |
| 2016/0035234 A1* | 2/2016 | Choi | G09B 7/00 434/323 |

OTHER PUBLICATIONS

Carapina, Adaptation in Technology Enhanced Learning, 2014.
Farr, Microsoft and Knewton Partner up to Bring Adaptive Learning to Publishers and Schools, Mar. 13, 2014.
The Higher Education Academy, HEA Feedback Toolkit, Mar. 2013.
Knewton, Unlimited Personalized Lessons from Knewton, 2015 http://www.knewton.com/.
Pearson, Learning Assessment, 2015, http://www.pearsonassessments.com/learningassessments.html.
Prineas et al. Assessing Learning in Online Education: The Role of Technology in Improving Student Outcomes, National Institute for Learning Outcomes Assessment, Oct. 2011.
Simonite, Questions Surround Software that Adapts to Students, MIT Technology Review, Nov. 26, 2012.
Lilly et al. Using Feedback to Promote Learning: Student and Tutor Perspectives, Practitioner Research in Higher Education, 2010, vol. 4 (1): p. 30-40.
Jack Matlov Chokwe, Students' and Tutors' Perceptions of Feedback on Academic Essays in an Open and Distance Learning Context, Open Praxis, vol. 7, Issue 1, Jan.-Mar. 2015, pp. 39-56.
Weng et al. A Personalized Quiz Game Based on Multi-Agent System, D.K.W. Chiu et al. (Eds.): ICWL 2011/2012 Workshops, LNCS 7697, pp. 100-109, 2014.
Latham, G., Towards Effective Feedback Practices in Teacher Education, 2007.

* cited by examiner

IMPLEMENTING ASSESSMENTS BY CORRELATING BROWSING PATTERNS

FIELD

The present application generally relates to information technology, and, more particularly, to browsing pattern analysis techniques.

BACKGROUND

Designing assessment systems by balancing the learning effectiveness and the overall user experience presents multiple challenges. For example, existing approaches fail to provide such balance, personalized to each student, by analyzing a student's past and current learning interactions.

SUMMARY

In one embodiment of the present invention, techniques for implementing assessments by correlating browsing patterns are provided. An exemplary computer-implemented method can include steps of detecting one or more web browsing anomalies (i) attributed to a user and (ii) related to answering questions pertaining to predetermined content, wherein detecting is based on at least (a) a classification of the user in relation to one or more additional users and (b) web browsing data associated with the user. The method can also include estimating the probability of the user answering a question pertaining to the predetermined content based on (i) a set of skills associated with the user and (ii) identification of one or more required concepts associated with the predetermined content. Further, the method can include dynamically generating at least two sets of questions pertaining to the predetermined content based on the one or more detected web browsing anomalies, wherein a first of the at least two sets of questions comprises questions directed to one or more segments of the predetermined content associated with at least one of the one or more detected web browsing anomalies, and wherein a second of the at least two sets of questions comprises questions directed to one or more segments of the predetermined content not associated with at least one of the one or more detected web browsing anomalies Also, the method can include determining a time interval during a user web tutorial session at which to pose to the user a question from one of the at least two sets of questions based at least on (i) the estimated probability and (ii) an estimated level of user engagement, and outputting to the user the question in accordance with the determined time interval.

Another embodiment of the invention includes detecting a web browsing anomaly (i) attributed to a user and (ii) during a web tutorial encompassing predetermined content, wherein said detecting is based on at least (a) a classification of the user in relation to one or more additional users and (b) web browsing activity of the user during the web tutorial. Such an embodiment also includes estimating the probability of the user answering a question pertaining to the predetermined content based on (i) a set of skills associated with the user and (ii) identification of one or more required concepts associated with the predetermined content. Further, such an embodiment of the invention also includes dynamically generating two sets of questions pertaining to the predetermined content based on the detected web browsing anomaly, wherein a first of the two sets of questions comprises questions directed to one or more segments of the predetermined content associated with the detected web browsing anomaly, and wherein a second of the two sets of questions comprises questions directed to one or more segments of the predetermined content not associated with the detected web browsing anomaly. Additionally, such an embodiment includes determining a temporal instance of a future portion of the web tutorial at which to pose to the user a question from one of the two sets of questions based on (i) the estimated probability and (ii) an estimated emotional state of the user, and outputting to the user the question at the determined temporal instance of the web tutorial.

Yet another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes implementing assessments by correlating browsing patterns. At least one embodiment of the invention includes providing personalized quizzes and/or questions related to online education for a user based on the user's browsing patterns and determined skills and/or expertise. Such an embodiment can include analyzing the user's browsing logs to capture and predict anomalies related to the user's focus in each segment, topic, and/or concept of the tutorials. Additionally, one or more embodiments of the invention can include determining the optimal timing for posing the questions based on the predicted anomalies.

Further, a current emotional tolerance state (such as engaged, encouraged, etc.) of the user can be determined and utilized to select an appropriate difficulty level for the posed questions. At the determined optimal time, at least one embodiment of the invention can include determining the toughest question and the easiest question personalized to the user based on predicted browsing pattern anomalies and the current emotional tolerance state of the user. The difficulty level of the questions can be determined by analyzing historical data such as past user performance in responding to particular questions (across multiple users, for example).

Figure 1:
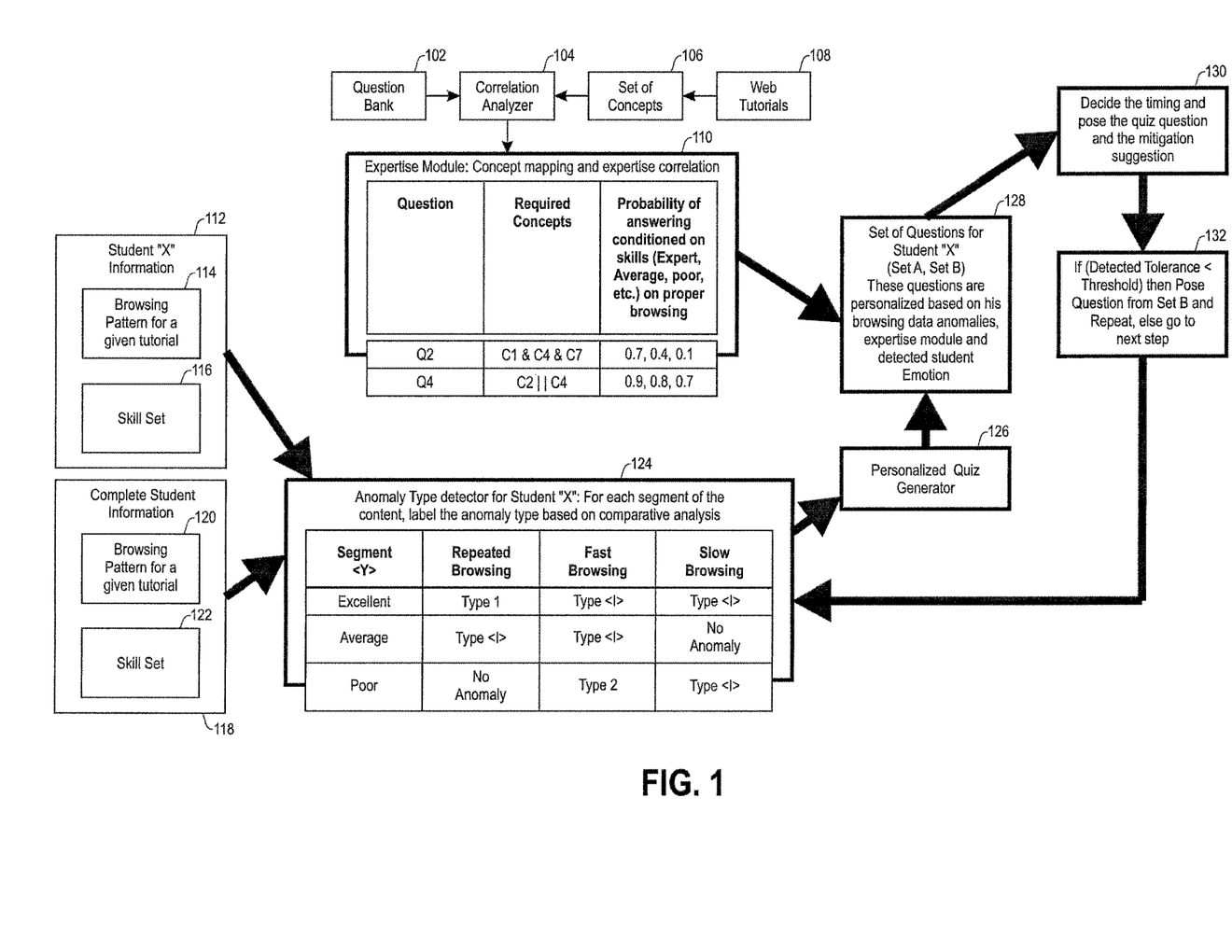
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a question bank 102 providing input to a correlation analyzer component 104. Additionally, a web tutorials component 108 provides input to generate a set of concepts 106, which are also provided to the correlation analyzer component 104. The correlation analyzer component 104 then provides input to an expertise module 110, which carries out concept mapping and expertise correlation based on a collection of questions, required concepts, and the probability of answering, conditioned on user skills based on proper browsing.

Accordingly, at least one embodiment of the invention includes identifying a user or student expertise score, which includes student skill-set modeling and capturing user browsing pattern. Input for such an identification can include prior information about the student's performance (grade point average, expertise, etc.), and the output generated includes a relative and/or absolute rating of user/student expertise for different topics and/or concepts. Such relative and absolute user ratings can be determined based on analysis of historical data such as user performance in responding to particular questions and/or user browsing patterns pertaining to particular concepts. Steps for generating this transformation can include fitting a distribution for the overall student population for each topic (based on each student's historical marks/grades), and computing the relative rating for the student in question based on the percentage of the student population below him or her with respect to rating. Also for each concept and/or topic, at least one embodiment of the invention includes rating the student for his or her understanding of that concept based on historical data, such as noted herein.

At least one embodiment of the invention can also include capturing a student's browsing patterns. Such an embodiment can include dividing content of all web tutorials into various segments, wherein each segment corresponds to a concept. Additionally, by analyzing browsing logs (such as, for example, observing the amount of time spent at particular segments within a web tutorial), such an embodiment of the invention can include determining the user's focus in each segment.

Additionally, FIG. 1 depicts a component 112 encompassing Student "X" information, which includes a browsing pattern 114 for a given tutorial and a skill set 116. Also, FIG. 1 depicts a component 118 encompassing complete student information, which includes a browsing pattern 120 for a given tutorial and a skill set 122. Component 112 and component 118 provide input (skill set information and browsing patterns for particular web tutorials) to an anomaly type detector component 124, wherein the anomaly type detector component 124 is associated with Student "X" and labels, for each segment of content, the anomaly type (as further described herein) identified based on comparative analysis.

Accordingly, at least one embodiment of the invention can include detecting and categorizing anomalies in a user's/student's browsing pattern. Input for such actions can include browsing data for all students for an online video/tutorial for a given subject, as well as an identification of the different concepts required to understand different segments of the video. Such required concepts can be established and/or pre-determined, for example, as part of a given curriculum or educational standard. The output generated can include one or more anomalies identified and/or flagged in the browsing patterns of the students. Steps for carrying out such a transformation can include partitioning and/or breaking-down the video into different segments (based, for example, on subject matter distinctions and/or relatedness to one or more particular concepts), and classifying each student (for example, classify as exceptional, above average, average, or below average) for each segment based on subject expertise and concept expertise based, for example, on information derived from component 112 and/or component 118 (as depicted in FIG. 1).

Anomalies can be detected using historical browsing data for students for various videos and the student's performance in assessments for those videos. Further, a machine learning model can be trained using, for example, a decision tree to generate rules (as detailed below via multiple examples) that can be used to flag anomalies in the current browsing data and/or subsequent browsing data.

Additionally, a rule-based engine can be used to identify anomalies by correlating browsing patterns of various students as well as the skill-sets of those various students. For example, if the average time of an "Exceptional" student>the time taken by a "Below Average" student for a segment, then a "TYPE 1 Anomaly" can be identified. If the number of repetitions of an "Exceptional" student for a segment>X, then a "TYPE 2 Anomaly" can be identified. Further, if the average number of repetitions for an "Exceptional" or "Above Average" student for a segment>Y, then a "TYPE 3 Anomaly" can be identified. Also, by way of additional example, if the basic concept required to understand a segment is C1 and the student is weak in concept C1, and the overall time spent on the segment<t1, then a "TYPE 4 Anomaly" can be identified.

Using steps such as these, at least one embodiment of the invention can include generating an anomaly table for each student.

As noted above, at least one embodiment of the invention can include concept mapping and expertise correlation (via the expertise module 110, for example). As also noted, input for such actions can include question bank 102 and one or more web tutorials 108. The output of such actions can include a calculated probability of answering conditioned on skills (Expert, Average, etc.), and a browsing pattern for each question in the question bank 102. Steps for carrying out such a transformation can include recording a response every time a response is posed as part of a personalized quiz to any student. Based on the skill and browsing pattern of the student and his or her response, at least one embodiment of the invention can include revising the probability estimates.

Referring again to FIG. 1, the above-noted output generated by the expertise module 110 is provided to form a set of questions 128 (Set A, Set B) for the given student (Student "X"). Additionally, the anomaly type detector 124 for Student "X" provides output (detected browsing pattern anomalies) to a personalized quiz generator component 126, which ultimately also provides input to help generate the customized set of questions 128 for Student "X." Specifically, in one or more embodiments of the invention, the output of the expertise module 110 (the coordination of questions from the question bank with the related required concepts and the calculated probabilities of given users answering the questions correctly) is combined with the output of the anomaly type detector (detected browsing pattern anomalies) to determine specific questions to pose to Student "X" (depicted as element 128 in FIG. 1) via the personalized quiz generator 126.

Additionally, the set of questions 128 for Student "X" can be personalized based on the browsing data anomalies associated with Student "X" as well as a detected student emotion. In at least one embodiment of the invention, the emotional state of a user/student can be determined by analyzing historical data pertaining to the user such as, for example, data related to the number of questions answered incorrectly by a user prior to the user terminating his or her web tutorial session.

As also depicted in FIG. 1, the determined set of personalized questions 128 is provided to timing component 130 that determines the timing (within the user's/student's web tutorial session) to pose the personalized quiz questions as well as any mitigation suggestions. Output from the timing component (that is, the timing determinations for posing the questions 128) is provided to component 132, which determines that if the detected tolerance (emotional state) of the user/student is less than a given threshold amount, then a question from Set B is posed. As further detailed below, the example Set B questions includes questions which Student "X" is most likely to answer correctly based on the segments, wherein conformities (across other students, for example) are detected. Such a sequence of events as detailed above can be repeated, or else the workflow proceeds back to the anomaly type detector 124.

As noted above, at least one embodiment of the invention includes implementing a robust assessment system based on optimal timing of personalized quizzes. Inputs for such an action can include various discovered anomalies in browsing data for each student. The output generated in connection with such an action can include a set of questions 128 generated by the personalized quiz generator 126 for each student.

Steps for generating such a transformation can include the following. For Student 'X' with anomalies identified for one or more segments, the concepts corresponding to those segments are examined to determine an optimal time to ask the question by considering a tradeoff between effectiveness in learning and user-experience. Such a consideration can be based, for example, on the detected emotional state (engaged, encouraged, etc.) of the student. Further, at least one embodiment of the invention can include selecting Set A and Set B questions. As used herein, Set A questions include the top 'n' questions from the list based on the likelihood of Student "X" not answering the question and also the expertise level of Student "X." Also, as noted above herein, Set B questions include questions which Student "X" is most likely to answer correctly based on the segments wherein conformities are detected.

One or more embodiments of the invention can additionally include determining the current tolerance state of the student for one or more additional challenging questions. A current tolerance state can be determined, for example, using various heuristics such as using historical data to determine the likelihood of the student quitting given "n1" number of successive wrong answers, emotion detection techniques, etc. By way merely of example, if a tolerance state>an emotional threshold, then a question from Set A can be provided, otherwise a question from Set B can be provided to ensure that the student does not get discouraged.

For each question posed from Set A, the potential mitigation suggestion (that is, a recommendation directing the student to the segment of the content which may help him or her answer the question) can also be provided. Additionally, based on the answer provided by the student, at least one embodiment of the invention can include returning to detect new anomalies (via component 124 in FIG. 1, for example).

As noted above, at least one embodiment of the invention can include determining the timing of when to pose a given question. Inputs for such an action can include segments $S=\{1, 2, \ldots, n\}$ for a given video with associated concepts $\{c_1, c_2, \ldots, c_n\}$, a concept graph associated with the above-noted concepts, a quiz concept mapping table (that is, the mapping between questions and required concepts, such as generated via module 110 in FIG. 1), and the output of an expertise model (that is, conditional probabilities). The output of such an action can include the determination of an appropriate timing of the quiz and question selection from the question bank.

Steps for carrying out such a timing determination can include the following. For a user/student i, let $B_{ij}$ denote his or her browsing history until the end of segment j. Also, let $A_{ij}$ denote the user's set of browsing anomalies detected until segment j. Given browsing data until the end of segment j, at least one embodiment of the invention includes maintaining "relative entropy" for each question for complete browsing compared to the current browsing data and anomalies given the expertise level. If the relative entropy for any of the questions>an intervention threshold, then a quiz question can be posed from Set A or Set B, wherein the selection can be based on the determined emotional state of the user/student, and wherein the "intervention threshold" can be decided based on desired levels of user experience and effectiveness of learning.

By way of illustration, consider the following example pertaining to question eligibility for a quiz based on "relative entropy." Assume that question Q1 in the question bank is based on the understanding of concepts C2 and C4, and a student of skill set "S1" is browsing the video. Further assume that the student skips content C2 and the intervention threshold=1.5. Accordingly, at time t2, at least one embodiment of the invention can include computing a relative entropy=$0.3*\log(0.3/0.1)+0.7*\log(0.7/0.9)=0.22$. (The decimal values in the example in the previous sentence correspond, for example, to probabilities of correctly answering a given question conditioned on student skill level, such as depicted in FIG. 1 via expertise module 110.) As the relative entropy value is less than the intervention threshold in this example, the question will not be asked at time t2.

However, if the user further skips content C4, then at time t2, the relative entropy=$0.9*\log(0.9/0.1)+0.1*\log(0.1/0.9)=2.53$ (which is >1.5). Accordingly, in this instance, at time t2, question Q1 can be posed to the student/user.

Figure 2:
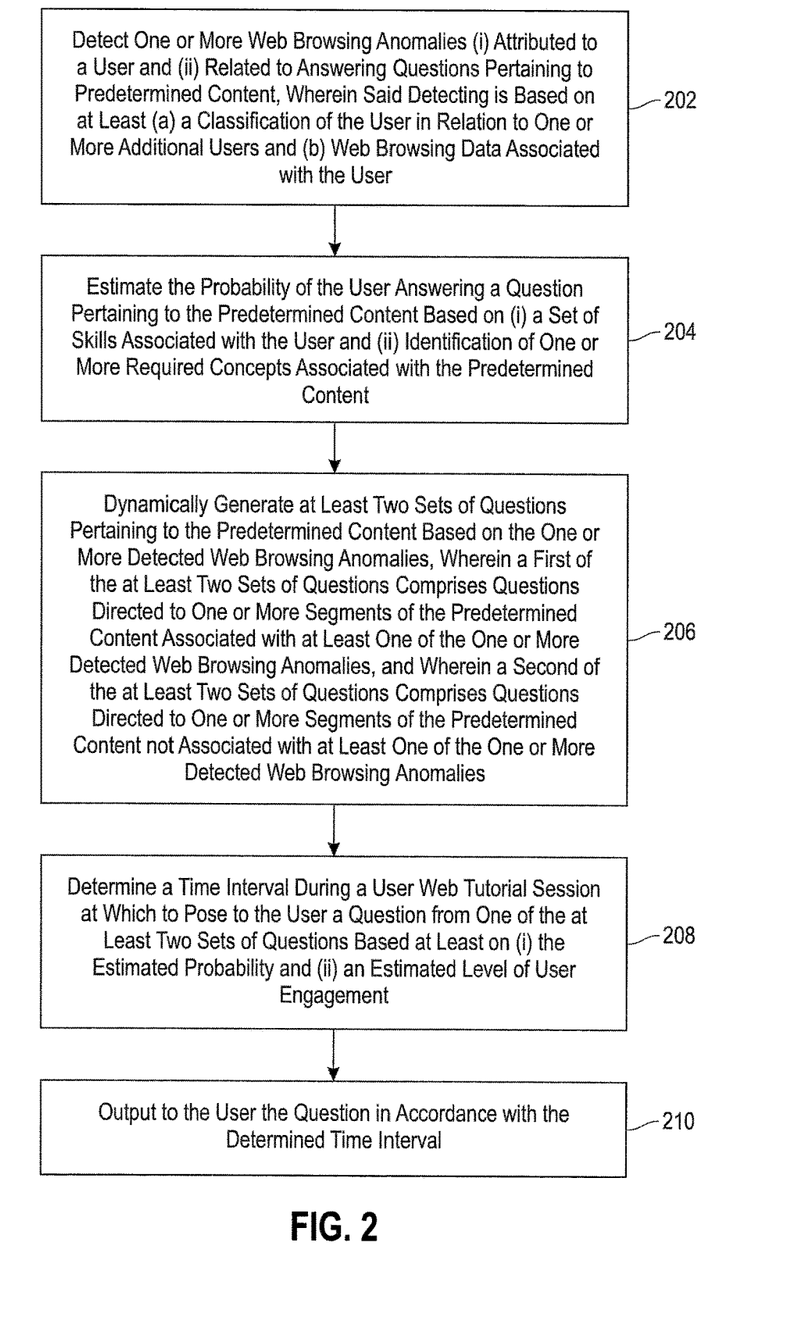
FIG. 2 is a flow diagram illustrating techniques according to an embodiment of the invention.

FIG. 2 is a flow diagram illustrating techniques according to an embodiment of the present invention. Step 202 includes detecting one or more web browsing anomalies (i) attributed to a user and (ii) related to answering questions pertaining to predetermined content, wherein said detecting is based on at least (a) a classification of the user in relation to one or more additional users and (b) web browsing data associated with the user. The web browsing data can include one or more web browsing patterns.

Step 204 includes estimating the probability of the user answering a question pertaining to the predetermined content based on (i) a set of skills associated with the user and (ii) identification of one or more required concepts associated with the predetermined content. The set of skills can be based on historical information pertaining to performance of the user. The set of skills can also be based on a relative rating of user expertise for one or more concepts related to the predetermined content, wherein the relative rating is in relation to one or more additional users. Additionally, the set of skills can be based on an absolute rating of user expertise for one or more concepts related to the predetermined content.

Step 206 includes dynamically generating at least two sets of questions pertaining to the predetermined content based on the one or more detected web browsing anomalies, wherein a first of the at least two sets of questions comprises questions directed to one or more segments of the predetermined content associated with at least one of the one or more detected web browsing anomalies, and wherein a second of the at least two sets of questions comprises questions directed to one or more segments of the predetermined content not associated with at least one of the one or more detected web browsing anomalies.

Step 208 includes determining a time interval during a user web tutorial session at which to pose to the user a question from one of the at least two sets of questions based at least on (i) the estimated probability and (ii) an estimated level of user engagement. In at least one embodiment of the invention, determining the time interval can be further based on a confidence level associated with the one or more detected web browsing anomalies. Additionally, determining the time interval can also be further based on a consideration of a level of challenge provided to the user. Also, in one or more embodiments of the invention, the estimated level of user engagement can be based on historical user data pertaining to user behavior in connection with answering questions during a web tutorial.

Step 210 includes outputting to the user the question in accordance with the determined time interval.

Another embodiment of the invention can include detecting a web browsing anomaly (i) attributed to a user and (ii) during a web tutorial encompassing predetermined content, wherein said detecting is based on at least (a) a classification of the user in relation to one or more additional users and (b) web browsing activity of the user during the web tutorial. Such an embodiment can also include estimating the probability of the user answering a question pertaining to the predetermined content based on (i) a set of skills associated with the user and (ii) identification of one or more required concepts associated with the predetermined content. Further, such an embodiment of the invention can also include dynamically generating two sets of questions pertaining to the predetermined content based on the detected web browsing anomaly, wherein a first of the two sets of questions comprises questions directed to one or more segments of the predetermined content associated with the detected web browsing anomaly, and wherein a second of the two sets of questions comprises questions directed to one or more segments of the predetermined content not associated with the detected web browsing anomaly. Additionally, such an embodiment can include determining a temporal instance of a future portion of the web tutorial at which to pose to the user a question from one of the two sets of questions based on (i) the estimated probability and (ii) an estimated emotional state of the user, and outputting to the user the question at the determined temporal instance of the web tutorial.

At least one embodiment of the invention (such as the techniques depicted in FIG. 2, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives assessment and/or browsing information sent from a data source to the transmission server. The server can process the information, for example, based upon user-provided user preference information that is stored in memory on the server. Subsequently, an alert is generated containing the assessment and/or browsing information. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
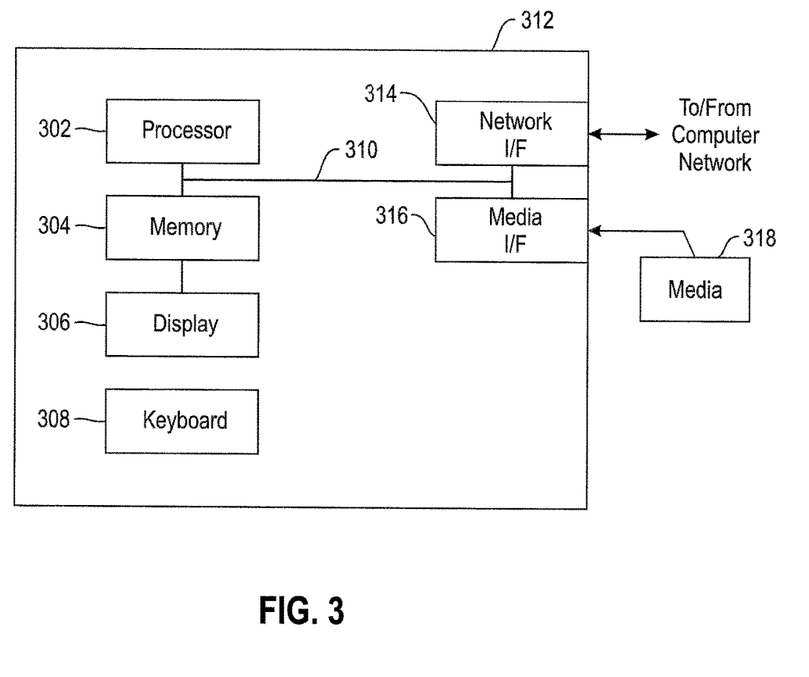
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, determining the optimal timing for posing questions based on predicted anomalies in a user's browsing behavior and current emotional state of the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    detecting one or more web browsing anomalies (i) attributed to a user and (ii) related to answering questions pertaining to predetermined content, wherein said detecting is based on at least (a) a classification of the user in relation to one or more additional users and (b) web browsing data associated with the user;
    estimating the probability of the user answering a question pertaining to the predetermined content based on (i) a set of skills associated with the user and (ii) identification of one or more required concepts associated with the predetermined content;
    dynamically generating at least two sets of questions pertaining to the predetermined content based on the one or more detected web browsing anomalies, wherein a first of the at least two sets of questions comprises questions directed to one or more segments of the predetermined content associated with at least one of the one or more detected web browsing anomalies, and wherein a second of the at least two sets of questions comprises questions directed to one or more segments of the predetermined content not associated with at least one of the one or more detected web browsing anomalies;
    determining a time interval during a user web tutorial session at which to pose to the user a question from one of the at least two sets of questions based at least on (i) the estimated probability and (ii) an estimated level of user engagement; and
    outputting to the user the question in accordance with the determined time interval;
    wherein the steps are carried out by at least one computing device.

2. The computer-implemented method of claim 1, wherein the web browsing data comprise one or more web browsing patterns.

3. The computer-implemented method of claim 1, wherein the set of skills is based on historical information pertaining to performance of the user.

4. The computer-implemented method of claim 1, wherein the set of skills is based on a relative rating of user expertise for one or more concepts related to the predetermined content, wherein the relative rating is in relation to one or more additional users.

5. The computer-implemented method of claim 1, wherein the set of skills is based on an absolute rating of user expertise for one or more concepts related to the predetermined content.

6. The computer-implemented method of claim 1, wherein said determining the time interval is further based on a confidence level associated with the one or more detected web browsing anomalies.

7. The computer-implemented method of claim 1, wherein said determining the time interval is further based on a consideration of a level of challenge provided to the user.

8. The computer-implemented method of claim 1, wherein the estimated level of user engagement is based on historical user data pertaining to user behavior in connection with answering questions during a web tutorial.

9. A computer program product comprising a non-transitory computer readable storage medium having program instructions embodied therewith, the program instructions executable by a device to cause the device to:
   detect one or more web browsing anomalies (i) attributed to a user and (ii) related to answering questions pertaining to predetermined content, wherein said detecting is based on at least (a) a classification of the user in relation to one or more additional users and (b) web browsing data associated with the user;
   estimate the probability of the user answering a question pertaining to the predetermined content based on (i) a set of skills associated with the user and (ii) identification of one or more required concepts associated with the predetermined content;
   dynamically generate at least two sets of questions pertaining to the predetermined content based on the one or more detected web browsing anomalies, wherein a first of the at least two sets of questions comprises questions directed to one or more segments of the predetermined content associated with at least one of the one or more detected web browsing anomalies, and wherein a second of the at least two sets of questions comprises questions directed to one or more segments of the predetermined content not associated with at least one of the one or more detected web browsing anomalies;
   determine a time interval during a user web tutorial session at which to pose to the user a question from one of the at least two sets of questions based at least on (i) the estimated probability and (ii) an estimated level of user engagement; and
   output to the user the question in accordance with the determined time interval.

10. The computer program product of claim 9, wherein the web browsing data comprise one or more web browsing patterns.

11. The computer program product of claim 9, wherein the set of skills is based on historical information pertaining to performance of the user.

12. The computer program product of claim 9, wherein the set of skills is based on a relative rating of user expertise for one or more concepts related to the predetermined content, wherein the relative rating is in relation to one or more additional users.

13. The computer program product of claim 9, wherein the set of skills is based on an absolute rating of user expertise for one or more concepts related to the predetermined content.

14. The computer program product of claim 9, wherein said determining the time interval is further based on a confidence level associated with the one or more detected web browsing anomalies.

15. The computer program product of claim 9, wherein said determining the time interval is further based on a consideration of a level of challenge provided to the user.

16. The computer program product of claim 9, wherein the estimated level of user engagement is based on historical user data pertaining to user behavior in connection with answering questions during a web tutorial.

17. A system comprising:
   a memory; and
   at least one processor coupled to the memory and configured for:
      detecting one or more web browsing anomalies (i) attributed to a user and (ii) related to answering questions pertaining to predetermined content, wherein said detecting is based on at least (a) a classification of the user in relation to one or more additional users and (b) web browsing data associated with the user;
      estimating the probability of the user answering a question pertaining to the predetermined content based on (i) a set of skills associated with the user and (ii) identification of one or more required concepts associated with the predetermined content;
      dynamically generating at least two sets of questions pertaining to the predetermined content based on the one or more detected web browsing anomalies, wherein a first of the at least two sets of questions comprises questions directed to one or more segments of the predetermined content associated with at least one of the one or more detected web browsing anomalies, and wherein a second of the at least two sets of questions comprises questions directed to one or more segments of the predetermined content not associated with at least one of the one or more detected web browsing anomalies;
      determining a time interval during a user web tutorial session at which to pose to the user a question from one of the at least two sets of questions based at least on (i) the estimated probability and (ii) an estimated level of user engagement; and
      outputting to the user the question in accordance with the determined time interval.

18. The system of claim 17, wherein said determining the time interval is further based on a confidence level associated with the one or more detected web browsing anomalies.

19. The system of claim 17, wherein said determining the time interval is further based on a consideration of a level of challenge provided to the user.

20. A computer-implemented method, comprising:
   detecting a web browsing anomaly (i) attributed to a user and (ii) during a web tutorial encompassing predetermined content, wherein said detecting is based on at least (a) a classification of the user in relation to one or more additional users and (b) web browsing activity of the user during the web tutorial;

estimating the probability of the user answering a question pertaining to the predetermined content based on (i) a set of skills associated with the user and (ii) identification of one or more required concepts associated with the predetermined content;

dynamically generating two sets of questions pertaining to the predetermined content based on the detected web browsing anomaly, wherein a first of the two sets of questions comprises questions directed to one or more segments of the predetermined content associated with the detected web browsing anomaly, and wherein a second of the two sets of questions comprises questions directed to one or more segments of the predetermined content not associated with the detected web browsing anomaly;

determining a temporal instance of a future portion of the web tutorial at which to pose to the user a question from one of the two sets of questions based on (i) the estimated probability and (ii) an estimated emotional state of the user; and outputting to the user the question at the determined temporal instance of the web tutorial;

wherein the steps are carried out by at least one computing device.

* * * * *